(12) United States Patent
Ko et al.

(10) Patent No.: US 9,119,199 B2
(45) Date of Patent: Aug. 25, 2015

(54) METHOD AND APPARATUS FOR TRANSMITTING DOWNLINK SIGNAL IN A MIMO WIRELESS COMMUNICATION SYSTEM

(71) Applicant: LG ELECTRONICS INC., Seoul (KR)

(72) Inventors: Hyun Soo Ko, Anyang-si (KR); Moon Il Lee, Anyang-si (KR); Ja Ho Koo, Anyang-si (KR); Jae Hoon Chung, Anyang-si (KR); Bin Chul Ihm, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/246,947

(22) Filed: Apr. 7, 2014

(65) Prior Publication Data

US 2014/0219213 A1     Aug. 7, 2014

Related U.S. Application Data

(63) Continuation of application No. 12/862,610, filed on Aug. 24, 2010, now Pat. No. 8,731,088.

(60) Provisional application No. 61/241,969, filed on Sep. 14, 2009, provisional application No. 61/242,286, filed on Sep. 14, 2009, provisional application No. 61/250,854, filed on Oct. 12, 2009, provisional application No. 61/297,430, filed on Jan. 22, 2010.

(30) Foreign Application Priority Data

Mar. 29, 2010   (KR) ................. 10-2010-0027988

(51) Int. Cl.
| | | |
|---|---|---|
| H04B 7/02 | (2006.01) | |
| H04W 72/04 | (2009.01) | |
| H04B 7/04 | (2006.01) | |

(52) U.S. Cl.
CPC ............. *H04W 72/042* (2013.01); *H04B 7/04* (2013.01); *H04B 7/0413* (2013.01)

(58) Field of Classification Search
CPC ....... H04L 5/0053; H04L 1/0026; H04L 1/06; H04L 5/005; H04B 7/04; H04B 7/02
See application file for complete search history.

(56) References Cited

U.S. PATENT DOCUMENTS

| | | | |
|---|---|---|---|
| 8,731,088 B2 * | 5/2014 | Ko et al. .................. | 375/267 |
| 2008/0043867 A1 | 2/2008 | Blanz et al. | |

(Continued)

FOREIGN PATENT DOCUMENTS

| | | |
|---|---|---|
| CN | 101330372 | 12/2008 |
| CN | 101465720 | 6/2009 |

(Continued)

OTHER PUBLICATIONS

Motorola, "Control Signaling for LTE Rel-9 Enhanced DL transmission," 3GPP TSG RAN WG1 #58, R1-093408, Aug. 2009, 9 pages.
The State Intellectual Property Office of the People's Republic of China Application Serial No. 201080039971.7, Office Action dated Jan. 6, 2014, 7 pages.
Russian Federation Federal Service for Intellectual Property, Patents and Trademarks Application Serial No. 2012114789/07, Office Action dated Aug. 6, 2013, 11 pages.

(Continued)

*Primary Examiner* — Kenneth Lam
(74) *Attorney, Agent, or Firm* — Lee, Hong, Degerman, Kang & Waimey

(57) ABSTRACT

A method and apparatus for transmitting a downlink signal in a multiple input multiple output (MIMO) wireless communication system is disclosed. A method for receiving a downlink signal from a base station to a user equipment in a multiple input multiple output (MIMO) system, which supports dual layer transmission based on first and second antenna ports, comprises receiving downlink control information (DCI) through a downlink control channel; and receiving downlink data through a downlink data channel, the downlink data including one or more of a first transport block and a second transport block, wherein the downlink control information includes a new data indicator (NDI) for each of the first and second transport blocks, and if the first transport block is disabled and the second transport block is enabled, the new data indicator for the first transport block indicates an antenna port through which the second transport block is received.

11 Claims, 8 Drawing Sheets

(56) References Cited

U.S. PATENT DOCUMENTS

| | | | |
|---|---|---|---|
| 2008/0188259 | A1 | 8/2008 | Blanz et al. |
| 2008/0225965 | A1 | 9/2008 | Pi et al. |
| 2010/0260059 | A1 | 10/2010 | Zhang et al. |
| 2010/0303034 | A1* | 12/2010 | Chen et al. ............... 370/329 |
| 2010/0323684 | A1 | 12/2010 | Cai et al. |
| 2010/0323709 | A1 | 12/2010 | Nam et al. |
| 2011/0019776 | A1 | 1/2011 | Zhang et al. |
| 2011/0035639 | A1 | 2/2011 | Earnshaw et al. |
| 2011/0085507 | A1 | 4/2011 | Jongren |
| 2011/0103247 | A1* | 5/2011 | Chen et al. ............... 370/252 |
| 2011/0170498 | A1* | 7/2011 | Liu et al. ............... 370/329 |
| 2011/0194504 | A1 | 8/2011 | Gorokhov et al. |
| 2011/0194536 | A1* | 8/2011 | Kim et al. ............... 370/335 |

FOREIGN PATENT DOCUMENTS

| | | |
|---|---|---|
| RU | 2007134339 | 3/2009 |
| WO | 2007/053840 | 5/2007 |

OTHER PUBLICATIONS

Ericsson, et al., "CR 36.212 Introduction of enhanced dual layer transmission," 3GPP TSG-RAN WG1 Meeting #59, R1-095132, Nov. 2009, 9 pages.

InterDigital Communications, LLC, "DL Control Signalling for LTE Rel-9 Dual-Layer Beannfornning," 3GPP TSG RAN WG1 Meeting #58bis, R1-093884, Oct. 2009, 4 pages.

Motorola, "Control Signalling for LTE Rel-9 Enhanced DL transmission," 3GPP TSG RAN WG1 #58, R1-093408, Aug. 2009, 7 pages.

Potevio, "Discussion on DL Control Signalling for Dual-layer Beamforming," 3GPP TSG RAN WG1 #58, R1-093441, Aug. 2009, 4 pages.

European Patent Office Application Serial No. 10009391.3, Search Report dated Aug. 21, 2013, 8 pages.

3GPP TS 36.212 V8.7.0, Release 8, May 2009, pp. 49-51.

LTE, "Evolved Universal Terrestrial Radio Access (E-UTRA); Multiplexing and channel coding (3GPP TS 36.212 version 8.7.0 Release 8)," ETSI TS 136 212 V8.7.0, Jun. 2009, 62 pages.

* cited by examiner

FIG. 3

DCI format 2A

| Resource Block Assignment | | N bits |
|---|---|---|
| TPC command for PUCCH | | 2 bits |
| Downlink Assignment Index | | 2 bits |
| HARQ process number | | 3 bits(FDD), 4 bits(TDD) |
| Transport Block to codeword swap flag | | 1 bit |
| Transport block 1 | MCS | 5 bits |
| | New data Indicator | 1 bit |
| | Redundancy version | 2 bits |
| Transport block 2 | MCS | 5 bits |
| | New data Indicator | 1 bit |
| | Redundancy version | 2 bits |
| Precoding information | | 0 bit(2Tx) |
| | | 2 bits(4Tx) |

FIG. 4

| Flag for format 0/format 1A differentiation | 1 bit |
|---|---|
| Localized/Distributed VRB assignment Flag | 1 bit |
| Resource Block Assignment | N bits |
| MCS | 5 bits |
| HARQ | 3 bits(FDD), 4 bits(TDD) |
| NDI | 1 bit |
| RV | 2 bits |
| TPC command for PUCCH | 2 bits |
| DL Assignment Index | 0 bit(FDD), 2bits(TDD) |

FIG. 5

| Localized/Distributed VRB assignment Flag | 1 bit |
|---|---|
| Resource Block Assignment | N bits |
| MCS | 5 bits |
| HARQ | 3 bits(FDD), 4 bits(TDD) |
| NDI | 1 bit |
| RV | 2 bits |
| TPC command for PUCCH | 2 bits |
| DL Assignment Index | 0 bit(FDD), 2bits(TDD) |
| TPMI Information for precoding | 2 bits(2Tx), 4 bits(4Tx) |

FIG. 6

| | | Single-layer Beamforming | Dual-layer Beamforming |
|---|---|---|---|
| Resource Block Assignment | | N bits | N bits |
| TPC command for PUCCH | | 2 bits | 2 bits |
| Downlink Assignment Index | | 2 bits | 2 bits |
| HARQ process number | | 3 bits(FDD), 4 bits(TDD) | 3 bits(FDD), 4 bits(TDD) |
| Layer Indicator (One codeword case) Transport Block to codeword swap flag (Two codeword case) | | 1 bit | 1 bit |
| Transport block 1 | MCS | 5 bits | 5 bits |
| | New data Indicator | 1 bit | 1 bit |
| | Redundancy version | 2 bits | 2 bits |
| Transport block 2 | MCS | 5 bits | 5 bits |
| | New data Indicator | 1 bit | 1 bit |
| | Redundancy version | 2 bits | 2 bits |
| Precoding information | | 0 bit | 0 bit |

FIG. 7

| | Single-layer Beamforming | Dual-layer Beamforming |
|---|---|---|
| Resource Block Assignment | N bits | N bits |
| TPC command for PUCCH | 2 bits | 2 bits |
| Downlink Assignment Index | 2 bits | 2 bits |
| HARQ process number | 3 bits(FDD), 4 bits(TDD) | 3 bits(FDD), 4 bits(TDD) |
| Transport Block to codeword swap flag (Two codeword case) | 1 bit | 1 bit |
| Transport block 1 — MCS | 5 bits | 5 bits |
| Transport block 1 — New data Indicator (Transport block 1 enabled) / Layer Indicator (Transport block 1 disabled) | 1 bit | 1 bit |
| Transport block 1 — Redundancy version | 2 bits | 2 bits |
| Transport block 2 — MCS | 5 bits | 5 bits |
| Transport block 2 — New data Indicator (Transport block 2 enabled) / Layer Indicator (Transport block 2 disabled) | 1 bit | 1 bit |
| Transport block 2 — Redundancy version | 2 bits | 2 bits |
| Precoding information | 0 bit | 0 bit |

FIG. 8

|  |  | Single-layer Beamforming | Dual-layer Beamforming |
|---|---|---|---|
| Resource Block Assignment | | N bits | N bits |
| TPC command for PUCCH | | 2 bits | 2 bits |
| Downlink Assignment Index | | 2 bits | 2 bits |
| HARQ process number | | 3 bits(FDD), 4 bits(TDD) | 3 bits(FDD), 4 bits(TDD) |
| Transport Block to codeword swap flag | | 0 bit | 0 bit |
| Transport block 1 | MCS | 5 bits | 5 bits |
| | New data Indicator (Transport block 1 enabled) Layer Indicator (Transport block 1 disabled) | 1 bit | 1 bit |
| | Redundancy version | 2 bits | 2 bits |
| Transport block 2 | MCS | 5 bits | 5 bits |
| | New data Indicator (Transport block 2 enabled) Layer Indicator (Transport block 2 disabled) | 1 bit | 1 bit |
| | Redundancy version | 2 bits | 2 bits |
| Precoding information | | 0 bit | 0 bit |

METHOD AND APPARATUS FOR TRANSMITTING DOWNLINK SIGNAL IN A MIMO WIRELESS COMMUNICATION SYSTEM

CROSS-REFERENCE TO RELATED APPLICATIONS

This application is a continuation of U.S. application Ser. No. 12/862,610, filed on Aug. 24, 2010, now U.S. Pat. No. 8,731,088, which claims the benefit of U.S. Provisional Application Nos. 61/241,969, filed on Sep. 14, 2009, 61/242,286, filed on Sep. 14, 2009, 61/250,854, filed on Oct. 12, 2009, and 61/297,430, filed on Jan. 22, 2010, and also claims the benefit of earlier filing date and right of priority to Korean Patent Application No. 10-2010-0027988, filed on Mar. 29, 2010, the contents of which are all hereby incorporated by reference herein in their entirety.

BACKGROUND OF THE INVENTION

1. Field of the Invention

The present invention relates to a wireless communication system, and more particularly, to a method and apparatus for transmitting a downlink signal in a multiple input multiple output (MIMO) wireless communication system.

2. Discussion of the Related Art

In a mobile communication system, a user equipment can receive information from a base station through a downlink. Also, the user equipment can transmit information to the base station through an uplink. Examples of the information transmitted from and received in the user equipment include data and various kinds of control information. Various physical channels exist depending on types and usage of the information transmitted from and received in the user equipment.

A multiple input multiple output (MIMO) scheme means that a base station and a user equipment simultaneously transmit several data streams spatially by using two or more transmitting/receiving antennas so as to increase system capacity. The MIMO schemes can implement transmit diversity, spatial multiplexing or beamforming by using several transmitting antennas.

The transmit diversity scheme is advantageous in that same data information is transmitted through several transmitting antennas to implement data transmission of high reliability without channel feedback from a receiver. The beamforming scheme is used to increase a received signal to interference plus noise ratio (SINR) of a receiver by multiplying several transmitting antennas by proper weight values. Generally, since uplink/downlink channels are independent in a frequency division duplexing (FDD) system, channel information of high reliability is required to obtain proper beamforming gain. In this case, the channel information is separately fed back from a receiver.

Meanwhile, the spatial multiplexing scheme can be divided into a single user spatial multiplexing scheme and a multi-user spatial multiplexing scheme. The single user spatial multiplexing scheme is referred to as a spatial multiplexing (SM) or single user MIMO (SU-MIMO). In the single user spatial multiplexing scheme, a plurality of antenna resources of a base station are allocated to a single user (user equipment), and capacity of a MIMO channel increases in proportion to the number of antennas. Meanwhile, the multi-user spatial multiplexing scheme is referred to as spatial divisional multiple access (SDMA) or multi-user MIMO (MU-MIMO). In the multi-user spatial multiplexing scheme, a plurality of antenna resources of a base station or radio spatial resources are distributed to a plurality of users (user equipments).

Examples of the MIMO scheme include a Single CodeWord (SCW) scheme and a Multiple CodeWord (MCW) scheme, wherein the SCW scheme is intended to transmit N number of data streams at the same time by using single channel encoding block, and the MCW scheme is intended to transmit N number of data streams by using M (M is always smaller than or equal to N) number of channel encoding blocks. In this case, each channel encoding block generates independent codewords, each of which is designed to enable independent error detection.

Meanwhile, a downlink control channel can include a control signal that defines resource allocation and transport format in respect of a signal transmitted through a downlink data channel. In the 3GPP LTE (long term evolution) standard, the downlink control channel and the downlink data channel are referred to as a physical downlink control channel (PDCCH) and a physical downlink shared channel (PDSCH), respectively, and control information transmitted through the PDCCH is referred to as downlink control information (DCI).

The base station determines a PDCCH format in accordance with DCI intended to be transmitted to a user equipment, and adds cyclic redundancy check (CRC) to control information. The CRC is masked with a unique identifier (referred to as radio network temporary identifier (RNTI)) in accordance with an owner or usage of the PDCCH. If the PDCCH is for a specific user equipment, the CRC is masked with a unique identifier of the user equipment, for example, C-RNTI (Cell-RNTI). If C-RNTI is used, the PDCCH carries control information for the corresponding specific user equipment. If another RNTI is used, the PDCCH carries common control information received by all user equipments or a plurality of user equipments within the cell.

After CRC is added to the DCI, channel coding, rate matching and modulation are performed, and the modulated symbols are mapped with physical resource elements and then transmitted to the user equipment. The user equipment monitors a plurality of PDCCHs per subframe. In this case, monitoring means that the user equipment tries to decode each of the PDCCHs in accordance with a DCI format which is monitored. In a control region allocated within a subframe, the base station does not provide the user equipment with information as to where the corresponding PDCCH is. The user equipment discovers its PDCCH by monitoring a collection of PDCCH candidates within the subframe. This will be referred to as blind decoding. For example, if the user equipment performs de-masking for its C-RNTI in the corresponding PDCCH and does not detect any CRC error, it detects a PDCCH having its DCI. The user equipment can be set semi-statically through upper layer signaling to receive PDSCH data signaled through the PDCCH subject to various transmission modes.

In order to receive a downlink signal, the user equipment receives a downlink resource on the PDCCH. If the user equipment successfully detects the PDCCH, it reads DCI on the PDCCH. The user equipment can receive downlink data on the PDSCH by using downlink resource allocation within the DCI.

In downlink signal transmission according to the aforementioned MIMO scheme, the base station can transmit control information as DCI through the PDCCH, wherein the control information is intended to allow the user equipment to normally receive a downlink signal. In case of downlink signal transmission that uses a new MIMO scheme different from the existing MIMO scheme, a problem may occur in that the user equipment fails to normally receive a downlink signal through control information subject to a DCI format defined previously. Accordingly, in a new downlink MIMO transmission scheme, it is required that control information required to normally receive a downlink signal should be provided to the user equipment.

SUMMARY OF THE INVENTION

Accordingly, the present invention is directed to a method and apparatus for transmitting a downlink signal in a multiple input multiple output (MIMO) wireless communication system, which substantially obviates one or more problems due to limitations and disadvantages of the related art.

An object of the present invention is to provide a method and apparatus for transmitting a downlink signal in a multiple input multiple output (MIMO) wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one aspect of the present invention, a method for receiving a downlink signal from a base station to a user equipment in a multiple input multiple output (MIMO) system, which supports dual layer transmission based on first and second antenna ports, comprises receiving downlink control information (DCI) through a downlink control channel; and receiving downlink data through a downlink data channel, the downlink data including one or more of a first transport block and a second transport block, wherein the downlink control information includes a new data indicator (NDI) for each of the first and second transport blocks, and if the first transport block is disabled and the second transport block is enabled, the new data indicator for the first transport block indicates an antenna port through which the second transport block is received.

Also, the new data indicator is given by 1 bit, if the new data indicator for the first data block is a first value, it indicates the first antenna port, and if the new data indicator for the first data block is a second value, it indicates the second antenna port.

Also, the second transport block is mapped with one of first and second codewords, one codeword mapped with the second transport block is mapped with one of first and second layers, and one layer mapped with one codeword, which is mapped with the second transport block, corresponds to one of the first and second antenna ports.

Also, the downlink control information further includes modulation and coding scheme (MCS) and redundancy version (RV) for each of the first and second transport blocks, and one or more of the modulation and coding scheme (MCS) and the redundancy version (RV) indicate whether a corresponding transport block is disabled.

Also, the method further comprises receiving a UE-specific reference signal for demodulating the downlink data for one or more of the first and second antenna ports.

Also, the downlink data channel is a physical downlink common channel (PDSCH), and the downlink control channel is a physical downlink control channel (PDSCH).

In another aspect of the present invention, a method for transmitting a downlink signal from a base station to a user equipment in a multiple input multiple output (MIMO) system, which supports dual layer transmission based on first and second antenna ports, comprises transmitting downlink control information (DCI) through a downlink control channel; and transmitting downlink data through a downlink data channel, the downlink data including one or more of a first transport block and a second transport block, wherein the downlink control information includes a new data indicator (NDI) for each of the first and second transport blocks, and if the first transport block is disabled and the second transport block is enabled, the new data indicator for the first transport block indicates an antenna port through which the second transport block is transmitted.

Also, the new data indicator is given by 1 bit, if the new data indicator for the first data block is a first value, it indicates the first antenna port, and if the new data indicator for the first data block is a second value, it indicates the second antenna port.

Also, the second transport block is mapped with one of first and second codewords, one codeword mapped with the second transport block is mapped with one of first and second layers, and one layer mapped with one codeword, which is mapped with the second transport block, corresponds to one of the first and second antenna ports.

Also, the downlink control information further includes modulation and coding scheme (MCS) and redundancy version (RV) for each of the first and second transport blocks, and one or more of the modulation and coding scheme (MCS) and the redundancy version (RV) indicate whether a corresponding transport block is disabled.

Also, the method further comprises transmitting a UE-specific reference signal for demodulating the downlink data for one or more of the first and second antenna ports.

Also, the downlink data channel is a physical downlink common channel (PDSCH), and the downlink control channel is a physical downlink control channel (PDCCH).

In still another aspect of the present invention, a user equipment for receiving a downlink signal from a base station in a multiple input multiple output (MIMO) system, which supports dual layer transmission based on first and second antenna ports, comprises a receiving module receiving control information and data from the base station; a transmitting module transmitting control information and data to the base station; and a processor connected with the receiving module and the transmitting module, controlling the user equipment, which includes the receiving module and the transmitting module, wherein the processor performs a control operation so that the receiving module receives downlink control information (DCI) through a downlink control channel, and receives downlink data through a downlink data channel, the downlink data including one or more of first and second transport blocks, the downlink control information includes a new data indicator (NDI) for each of the first and second transport blocks, and if the first transport block is disabled and the second transport block is enabled, the new data indicator for the first transport block indicates an antenna port through which the second transport block is received.

In further still another aspect of the present invention, a base station for transmitting a downlink signal to a user equipment in a multiple input multiple output (MIMO) system, which supports dual layer transmission based on first and second antenna ports, comprises a receiving module receiving control information and data from the user equipment; a transmitting module transmitting control information and data to the user equipment; and a processor connected with the receiving module and the transmitting module, controlling the base station, which includes the receiving module and the transmitting module, wherein the processor performs a control operation so that the transmitting module transmits downlink control information (DCI) through a downlink control channel, and transmits downlink data through a downlink data channel, the downlink data including one or more of first and second transport blocks, the downlink control information includes a new data indicator (NDI) for each of the first and second transport blocks, and if the first transport block is disabled and the second transport block is enabled, the new data indicator for the first transport block indicates an antenna port through which the second transport block is transmitted.

A method for efficiently configuring downlink control information required for downlink MIMO transmission is provided.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram illustrating a downlink control information (DCI) format 2A used in the present invention;

FIG. 4 is a diagram illustrating a DCI format 1A used in the present invention;

FIG. 5 is a diagram illustrating a DCI format 1D used in the present invention;

FIG. 6 is a diagram illustrating a new DCI format according to one embodiment of the present invention;

FIG. 7 is a diagram illustrating a new DCI format according to another embodiment of the present invention;

FIG. 8 is a diagram illustrating a new DCI format according to other embodiment of the present invention;

DETAILED DESCRIPTION OF THE INVENTION

Figure 1:
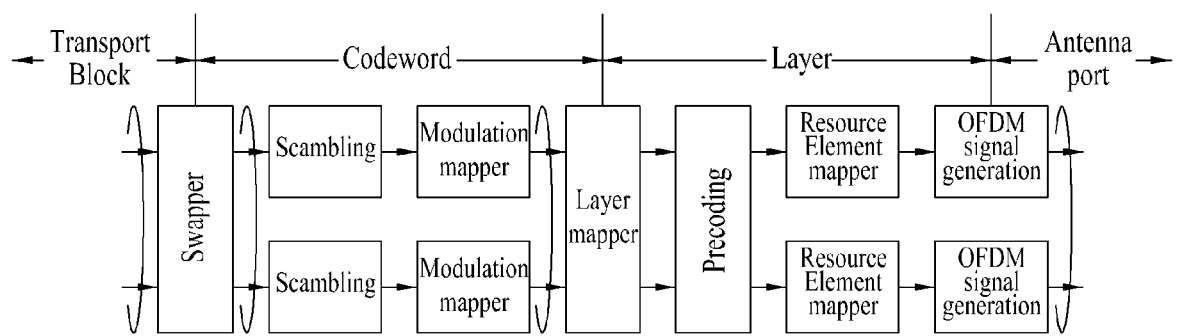
FIG. 1 is a block diagram illustrating a structure of a downlink MIMO system according to the related art.

Hereinafter, the preferred embodiments of the present invention will be described with reference to the accompanying drawings.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

The embodiments of the present invention have been described based on the data transmission and reception between a base station and a user equipment. In this case, the base station means a terminal node of a network that performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point (AP). Also, a relay device may be replaced with terms such as a relay node (RN) and a relay station (RS). Also, a terminal may be replaced with terms such as user equipment (UE), a mobile station (MS), a mobile subscriber station (MSS), and a subscriber station (SS).

Specific terminologies hereinafter described are provided to assist understanding of the present invention, and various modifications can be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein can be described by the above standard documents.

The following technology can be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA can be implemented by radio technology such as universal terrestrial radio access (UTRA) or CDMA2000. The TDMA can be implemented by radio technology such as global system for mobile communications (GSM)/general packet radio service (GPRS)/enhanced data rates for GSM evolution (EDGE). OFDMA can be implemented by radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE. WiMAX can be described by the IEEE 802.16e standard (WirelessMAN-OFDMA Reference System) and the advanced IEEE 802.16m standard (WirelessMAN-OFDMA Advanced system).

Although the following description will be based on the 3GPP LTE standard to clarify description, it is to be understood that technical spirits of the present invention are not limited to the 3GPP LTE standard.

MIMO (multiple input multiple output) technology can improve transmission and reception efficiency of data by using multiple transmitting antennas and multiple receiving antennas. The MIMO technology includes a spatial multiplexing, transmit diversity, and beamforming. A MIMO channel matrix subject to the number of receiving antennas and the number of transmitting antennas can be divided into a plurality of independent channels. Each independent channel will be referred to as a layer or stream. The number of layers or streams or a spatial multiplexing rate will be referred to as a rank.

The existing MIMO system is designed based on a Multiple CodeWord (MCW) scheme. The MCW scheme allows that two codewords are transmitted at the same time. For such MIMO transmission, modulation and coding scheme (MCS) information used by a transmitter, a new data indicator indicating whether transmitted data are new data or retransmission data, and redundancy version (RV) information as to what sub-packet is retransmitted in case of retransmission will be required.

FIG. 1 is a block diagram illustrating a structure of a downlink MIMO system according to the related art. In the system that supports a MIMO scheme, a base station can transmit one or more codewords to a downlink. The codewords are mapped with a transport block from an upper layer and will be described later. FIG. 1 exemplarily illustrates a system that supports maximum two codewords. One or more codewords can be processed as complex symbols through a scrambling module and a mapper. Then, the complex symbols are mapped with a plurality of layers by a layer mapper, wherein each layer is multiplied by a predetermined precoding matrix selected by a precoding module depending on a channel status and then can be allocated to each transmitting antenna. The transmission signal processed above for each antenna is mapped with a time-frequency resource element to be used for transmission by a resource element mapper, and then transmitted through an OFDM signal generator and each antenna in due order.

A transport block to codeword mapping rule will be described. In FIG. 1, two transport blocks (TBs) are mapped with two codewords by the transport block to codeword mapping rule. This mapping rule can be configured as illustrated in Table 1 and Table 2 below in accordance with a TB to CW swap flag.

TABLE 1

| TB to CW swap flag value | CW 0 (enabled) | CW 1 (enabled) |
|---|---|---|
| 0 | TB 1 | TB 2 |
| 1 | TB 2 | TB 1 |

TABLE 2

| TB 1 | TB 2 | CW 0 (enabled) | CW 1 (disabled) |
|---|---|---|---|
| enabled | disabled | TB 1 | — |
| disabled | enabled | TB 2 | — |

Table 1 illustrates that two transport blocks are enabled, and Table 2 illustrates an example of a transport block to codeword mapping rule when any one of two transport blocks is enabled and the other one is disabled.

In Table 2, in the case that the transport block is disabled, the size of the transport block is 0. If the size of the transport block is 0, the corresponding transport block is not mapped with a codeword.

If signal transmission is performed using a single antenna, one codeword is mapped with one layer and then transmitted. However, if signal transmission is performed using multiple antennas, a codeword-to-layer mapping rule can be configured as illustrated in Table 3 and Table 4 below in accordance with a transmission mode.

TABLE 3

| Number of layers | Number of code words | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |

TABLE 4

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 4 | 1 | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ If $M_{symb}^{(0)} \bmod 4 \neq 0$ two null symbols shall be appended to $d^{(0)}(M_{symb}^{(0)} - 1)$ |

Table 3 illustrates an example of signal transmission according to a spatial multiplexing scheme, and Table 4 illustrates an example of signal transmission according to a transmit diversity scheme. Also, in Table 3 and Table 4, $x^{(a)}(i)$ represents the ith symbol of a layer having index a, and $d^{(a)}(i)$ represents the ith symbol of a codeword having index a. A mapping rule between the number of codewords and the number of layers can be identified through 'Number of layers' and 'Number of codewords' in Table 3 and Table 4. Also, 'codeword-to-Layer mapping' represents how symbols of each codeword are mapped with a layer.

As noted in Table 3 and Table 4, although one codeword is mapped with one layer in a symbol unit and then transmitted, one codeword may be distributively mapped with maximum four layers as illustrated in the second example of Table 4.

A layer to physical antenna mapping rule will be described with reference to FIG. 2. The following description is only exemplary, and the layer to physical antenna mapping rule can have a random type. In the following description, it is assumed that a system that supports a MIMO transmission scheme has four physical transmitting antennas, for example. If rank is 1, one codeword CW1 is mapped with one layer, and data generated by one layer in accordance with a precoding scheme can be encoded to be transmitted through four transmitting antennas. If rank is 2, two codewords CW1 and CW2 are mapped with two layers and mapped with four transmitting antennas by a precoder. Also, if rank is 3, one codeword CW1 of two codewords is mapped with one layer, and the other one CW2 is mapped with two layers by a serial-to-parallel converter (S/P converter), whereby a total of two codewords are mapped with three layers and then mapped with four transmitting antennas by a precoder. Moreover, if rank is 4, two codewords CW1 and CW2 are respectively mapped with two layers by the serial-to-parallel converter, whereby a total of four layers are mapped with four transmitting antennas by the precoder.

Figure 2:
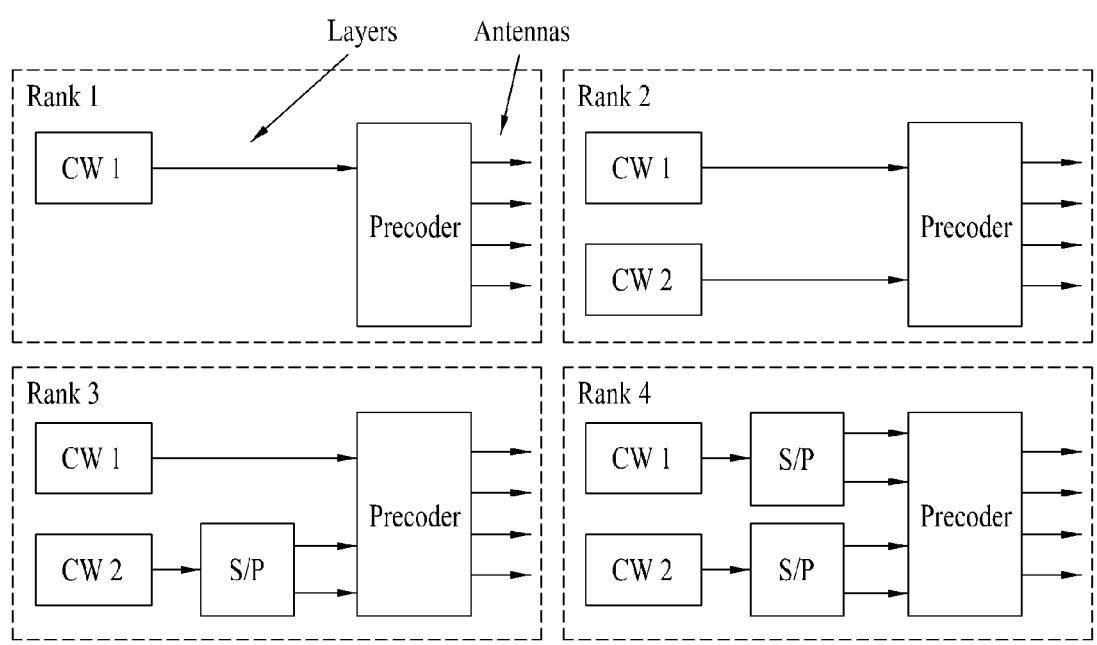
FIG. 2 is a diagram illustrating a mapping relation between a layer and a physical antenna in a downlink MIMO structure.

Although a base station having four transmitting antennas can have maximum four layers and four independent codewords, FIG. 2 illustrates an example of a system having maximum two codewords. Also, location of information transmitted through the codeword CW1 and location of information transmitted through the codeword CW2 may be changed to each other.

Meanwhile, the precoder is represented by Mt (the number of transmitting antennas)*v(spatial multiplexing rate) matrix, and adaptively uses a precoding matrix by using a collection of matrixes defined previously by a transmitter/receiver. A collection of these precoding matrixes will be referred to as a codebook.

In the existing 3GPP LTE system, four or more physical antenna ports (for example, antenna ports 0 to 5) can be used. In this case, identification of antenna ports is not physical identification. Accordingly, logical antenna index to physical antenna index mapping is varied depending on options of each manufacturer. It is not necessarily required that an antenna port should correspond to a physical antenna one to one. One antenna port may correspond to one physical antenna or an antenna array which is combination of a plurality of physical antennas.

In the 3GPP LTE system, three types of downlink reference signals are used. Namely, examples of the downlink reference signal include a cell-specific reference signal (having no relation with MBSFN transmission), an MBSFN reference signal related to MBSFN transmission, and a UE-specific reference signal.

The cell-specific reference signal is a reference signal based on a sequence generated using each cell ID as an initial value. For cell-specific reference signal transmission, antenna ports 0 to 3 can be used. Also, the MBSFN reference signal is used to acquire downlink channel information for MBSFN transmission, and is a reference signal transmitted through antenna port 4.

The UE-specific reference signal is supported for single antenna port transmission of a PDSCH, and can be transmitted through antenna port 5. The user equipment (UE) can be transferred from an upper layer (above MAC layer) whether the UE-specific reference signal can be used for PDSCH demodulation. The UE-specific reference signal enables beamforming of data transmission for a specific user equipment. For example, the base station can generate directivity transmission for a specific user equipment by using an array (one antenna port) of physical antennas, which are located near the base station. Signals from different physical antennas have phases appropriately set and can be joined together at the location of the user equipment. This directivity transmission is recognized by the user equipment as one antenna. Since a beam formed by beamforming suffers different channel responses between the base station and the user equipment, the UE-specific reference signal is required such that the user equipment normally demodulates beamformed data.

The aforementioned UE-specific reference signal corresponds to a dedicated reference signal (DRS) or a precoded demodulation reference signal (DMRS). If the precoded DMRS is used, the reference signals equivalent to a spatial multiplexing rate are transmitted.

The UE-specific reference signal may be used as single layer beamforming (beamforming of rank 1 transmission). As described above, since the UE-specific reference signal is precoded by the same precoder as that applied to data on the PDSCH, a precoding matrix is transparent to the user equipment. In other words, in case of transmission based on the UE-specific reference signal, since an estimated channel includes a precoding weight value, single layer beamforming can be implemented without precoding information. DCI format 1 or DCI format 1A of the aforementioned DCI format, which is defined for single antenna port transmission and transmit diversity, can be used for the single layer beamforming.

Meanwhile, in the existing 3GPP LTE (Release 8) system, since only antenna port 5 is defined as an antenna port to which the UE-specific reference signal is transmitted, data transmission using cell-specific reference signals (antenna ports 0 to 3) is required if rank is more than 2. In other words, each user equipment can perform data demodulation by using channel information acquired through the cell-specific reference signal and precoding weight information acquired through a control channel.

Recently, in the 3GPP LTE Release 9, dual layer beamforming (or dual stream beamforming) has been discussed. Dual layer beamforming means a MIMO transmission scheme that supports transmission of maximum rank 2 based on the UE-specific reference signal, and corresponding extension of the aforementioned single layer beamforming. According to the dual layer beamforming, maximum two enabled transport blocks are respectively with two codewords and then transmitted through two layers, and a dedicated reference signal for each layer is transmitted. According to the dual layer beamforming, even though the base station does not notify each user equipment of precoding information, the user equipment can receive MIMO transmission from the base station without multi-user interference by using channel information acquired through the UE-specific reference signal transmitted to each layer.

The dedicated reference signal for dual layer beamforming can be designed such that respective layers are orthogonal to each other, through a scheme such as time division multiplexing (TDM)/frequency division multiplexing (FDM)/code division multiplexing (CDM). If transmission is performed using a single layer only, one of dedicated reference signals that support two layers, which corresponds to single layer transmission, is notified, whereby throughput for data demodulation can be improved. Accordingly, a bit field indicating a reference signal used for single layer beamforming in downlink control information is required.

Also, according to the dual layer beamforming, data can be transmitted and received through two layers or a single layer. If different codewords are transmitted through two layers, it corresponds to multiple codeword single user-multiple input multiple output (MCW SU-MIMO). In case of single layer transmission, the user equipment can be operated in accordance with SU-MIMO or MU-MIMO. If data are transmitted to a single user by using a single layer, it corresponds to SU-MIMO. If two layers are respectively allocated to different users, it corresponds to MU-MIMO. In case of MU-MIMO, since each user equipment should divide the respective layers by using channel information acquired through the UE-specific reference signal, the base station can provide each user equipment with information indicating a layer corresponding to each user equipment, whereby the user equipment can acquire a channel. As described above, in the dual layer beamforming scheme, since maximum two layers are used, it is noted that 1-bit information is required to indicate one of two layers through the base station.

Hereinafter, new definition of a field, which is defined in the existing DCI format, to support dual layer beamforming in accordance with the embodiment of the present invention will be described. In the existing 3GPP LTE standard (for example, 3GPP LTE Release 8), DCI formats 0, 1, 1A, 1B, 1C, 1D, 2, 2A, 3 and 3A are defined. In brief, DCI format 0 represents uplink resource allocation information, DCI formats 1~2 represent downlink resource allocation information, DCI formats 3 and 3A represent uplink TPC (transmit power control) command for random UE groups.

FIG. 3 is a diagram illustrating a downlink control information (DCI) format 2A used in the present invention. The DCI format 2A corresponds to a control information format for opened-loop spatial multiplexing transmission. Opened-loop spatial multiplexing transmission means that spatial multiplexing transmission is performed without feedback from the user equipment.

The DCI format 2A supports maximum two codewords (transport blocks), and defines MCS, NDI, and RV for each transport block. As described above, the MCS is information of a modulation and coding scheme used by a transmitter, the NDI is a new data indicator indicating whether transmitted data are new data or retransmitted data, and RV means redundancy version information as to what sub-packet is retransmitted in case of retransmission. Meanwhile, a transport block to codeword swap flag, as illustrated in Table 1, represents swap as to mapping of two transport blocks to two codewords.

Precoding information defined in the DCI format 2A provides information of transmission rank. The precoding information is set to 0 bit (i.e., no precoding information exists) in case of transmission using two antenna ports, and is set to 2 bits in case of transmission using four antenna ports. A precoding information field for four antenna ports can be defined as illustrated in Table 5 below.

TABLE 5

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: precoder cycling with large delay CDD |
| 1 | 2 layers: precoder cycling with large delay CDD | 1 | 3 layers: precoder cycling with large delay CDD |
| 2 | reserved | 2 | 4 layers: precoder cycling with large delay CDD |
| 3 | reserved | 3 | reserved |

According to the DCI format 2A, transmit diversity transmission is performed in case of rank 1 (one codeword is enabled), and spatial multiplexing transmission having two codewords is performed in case of rank 2. Rank indication may be performed explicitly or implicitly. Explicit rank indication can be performed by a method for defining a separate rank indicator.

Meanwhile, the user equipment may acquire rank information implicitly without defining a rank indicator. In this case, whether the transport block is enabled or disabled can be indicated by MCS information and RV of the transport block. In the DCI format 2A, if MCS index value of the transport block is set to 0, for example, to represent the size of the transport block is 0, it means that transmission is not performed. Accordingly, the MCS information of the transport block indicates that the transport block is disabled. If the size of the transport block is not 0, it indicates that the transport block is enabled. Also, if the MCS index value is se to 0 and RV is set to 1, it indicates that the transport block is disabled. In other cases, it indicates that the transport block is enabled. Accordingly, the user equipment can implicitly identify that rank 2 transmission is performed if two transport blocks are enabled while rank 1 transmission is performed if one of two transport blocks is enabled and the other one is disabled.

New definition of a part of a bit field of the aforementioned DCI format 2A in accordance with one embodiment of the present invention will be described.

In the first embodiment, the transport block to codeword swap flag is used as a codeword indicator.

According to definition of the existing DCI 2A format, if one of two transport blocks is enabled, the transport block to codeword swap flag is reserved and the transport blocks 1 and 2 are mapped with codeword 0 (see Table 2). This embodiment suggests a method for using a transport block to codeword swap flag as an indicator of codeword mapped with one transport block if one of two transport blocks is enabled. In other words, the transport block to codeword swap flag can be reused as information indicating index of codeword used for single layer beamforming.

According to this embodiment, in a state that only one of two transport blocks is enabled, the transport block to codeword swap flag is not reserved and 1 bit value is given. In a state that only one of two transport blocks is enabled and the logic value of the swap flag is a first value, if the enabled transport block is transport block 1, the transport block 1 is mapped with codeword 0. If the enabled transport block is transport block 2, the transport block 2 is mapped with codeword 1. Meanwhile, in a state that only one of two transport blocks is enabled and a logic value of the swap flag is a second value, if the enabled transport block is transport block 1, the transport block 1 is mapped with codeword 1. If the enabled transport block is transport block 2, the transport block 2 is mapped with codeword 0. The first logic value of the swap flag corresponds to 0 or off, and its second logic value corresponds to 1 or on. The first and second logic values may have, but not limited to, a random type of 1/0 or on/off. In other words, the first logic value may correspond to 1 or on, and the second logic value may correspond to 0 or off. This definition of the first and second logic values can equally be applied to other fields according to the following embodiment.

Table 6 and Table 7 illustrate transport block to codeword mapping according to the first embodiment.

TABLE 6

| TB to CW mapping swap flag (one TB enabled) = 0 | | | |
| --- | --- | --- | --- |
| TB 1 | TB 2 | CW 0 | CW 1 |
| enabled | Disabled | TB 1 | — |
| disabled | enabled | — | TB 2 |

TABLE 7

| TB to CW mapping swap flag (one TB enabled) = 1 | | | |
| --- | --- | --- | --- |
| TB 1 | TB 2 | CW 0 | CW 1 |
| enabled | Disabled | — | TB 1 |
| Disabled | enabled | TB 2 | — |

In the second embodiment, the transport block to codeword swap flag is used as a codeword indicator.

According to this embodiment, if only one of two transport blocks is enabled, the transport block to codeword swap flag is not reserved and 1 bit value is given. In a state that only one of two transport blocks is enabled, if a logic value of the swap flag is a first value (0 or off), it can be defined that the enabled transport block is mapped with codeword 0. Meanwhile, in a state that only one of two transport blocks is enabled, if a logic value of the swap flag is a second value (1 or on), it can be defined that the enabled transport block is codeword 1. Table 8 and Table 9 illustrate transport block to codeword mapping according to the second embodiment.

TABLE 8

| TB to CW mapping swap flag (one TB enabled) = 0 | | | |
| --- | --- | --- | --- |
| TB 1 | TB 2 | CW 0 (enabled) | CW 1 (disabled) |
| enabled | Disabled | TB 1 | — |
| disabled | enabled | TB 2 | — |

TABLE 9

| TB to CW mapping swap flag (one TB enabled) = 1 | | | |
| --- | --- | --- | --- |
| TB 1 | TB 2 | CW 0 (disabled) | CW 1 (enabled) |
| enabled | Disabled | — | TB 1 |
| disabled | enabled | — | TB 2 |

In the third embodiment, the transport block to codeword swap flag is used as a layer indicator.

According to this embodiment, in a state that only one of two transport blocks is enabled and the other one is disabled, if a logic value of the swap flag is a first value (0 or off), it can be defined that the user equipment acquires channel information of a first layer. And, if the logic value of the swap flag is a second value (1 or on), it can be defined that the user equipment acquires channel information of a second layer.

Meanwhile, in a state that only one of two transport blocks is enabled, if transmission is indicated by the transmit diversity scheme, the transmit diversity scheme based on the second layer can be used. The user equipment can acquire channel information of two channels from a dedicated reference signal transmitted through each layer. In this case, the codeword to layer mapping can follow the mapping rule of Table 4.

In the fourth embodiment, a new data indicator (NDI) or a redundancy version (RV) field of the disabled transport block is used as a layer indicator or an antenna port indicator.

As described above, in the DCI format 2A, MCS, NDI and RV field are defined for the transport blocks. If one of two transport blocks is enabled and the other one is disabled, the NDI field or RV field of the disabled transport block can be used for another usage. As described above, if the MCS index value of the transport block is 0, or if the MCS index value is 0 and the RV value is 1, it can be defined that the corresponding transport block is disabled.

Since maximum two layers are used in the dual layer beamforming scheme, the base station can indicate one of two layers, which is used for single antenna port transmission, or antenna port, by using a 1-bit field of the DCI. For example, as illustrated in Table 1, if the NDI value of the disabled transport block is a first value (or 0), it indicates that the layer used for transmission is the first layer. If the NDI value of the disabled transport block is a second value (or 1), it indicates that the layer used for transmission is the second layer.

TABLE 10

| Indication of antenna port(or layer) for single-antenna port(or layer) transmission (one TB disabled) | |
| --- | --- |
| New Data Indicator of the disabled TB | Antenna port(or layer) |
| 0 | $1^{st}$ antenna port(or layer) |
| 1 | $2^{nd}$ antenna port(or layer) |

Meanwhile, layer indication may be performed using the RV field instead of the NDI field of the disabled transport block. It is supposed that if the MCS index value of the transport block is 0, it indicates that the transport block is disabled. In this case, it may be defined that if the RV field value of the disabled transport block is the first value (or 0), it indicates the first layer. It may also be defined that if the RV field value of the disabled transport block is the second value (or 1), it indicates the second layer.

In the fifth embodiment, a new data indicator (NDI) or a redundancy version (RV) field of the disabled transport block is used as an indicator as to transmit diversity transmission.

As described above, if two antenna ports are used, a precoding information field of the DCI format 2A is not defined. If the DCI format 2A is used for dual layer beamforming, uncertainty in rank 1 transmission occurs. In other words, according to definition of the existing DCI format 2A, if the precoding information field is not defined, whether rank 1 beamforming or rank 2 beamforming is performed can be identified by identifying whether two codewords are all enabled. In this respect, transmission according to the transmit diversity scheme is needed to be defined in the dual layer beamforming scheme. Since the transmit diversity scheme corresponds to rank 1 transmission, whether rank 1 beamforming or transmit diversity scheme is performed cannot be identified by the fact that one codeword which is disabled. Accordingly, if one codeword is disabled, the NDI or RV field of the disabled transport block can be used to identify whether transmit diversity transmission or rank 1 beamforming is performed. For example, if the NDI value of the disabled transport block is the first value (or 0), it indicates transmit diversity transmission. If the NDI value of the disabled transport block is the second value (or 1), it indicates rank 1 beamforming. In case of transmit diversity transmission, the user equipment may perform data demodulation by using either a cell-specific reference signal or a dedicated reference signal for transmission of two layers.

In the sixth embodiment, the transport block to codeword swap flag is used as an indicator indicating a transmission scheme.

According to this embodiment, if only one of two transport blocks is enabled, the transport block to codeword swap flag is not reserved, and either a transmit diversity scheme or single layer beamforming scheme can be indicated depending on the value of the swap flag. For example, if the swap flag is the first value, it indicates the transmit diversity scheme. If the swap flag is the second value, it indicates the single layer beamforming scheme.

In the seventh embodiment, the precoding information field defined in the DCI format 2A is newly defined for dual layer beamforming.

In the DCI format 2A, the precoding information field is set to 0 bit in case of transmission using two antenna ports, and is set to 2 bits in case of transmission using four antenna ports. Since maximum two antenna ports are used in the dual layer beamforming transmission mode, no precoding information field is needed as described above. Accordingly, the precoding information field can be set to 0. Even though a bit for the precoding information field is allocated in the dual layer beamforming transmission mode, it will not be defined.

Meanwhile, bit fields (for example, bit fields 2 and 3 if one codeword is enabled, and bit field 3 if two codewords are enabled) reserved from the precoding information field for four antenna ports exist in the existing DCI format 2A as illustrated in Table 5. These reserved bit fields may be defined for dual layer beamforming.

According to the aforementioned DCI format 2A, if only one of two codewords is enabled as described above, it may be defined that it means single layer precoding, or it may be defined that it means the transmit diversity scheme. Accordingly, if only one of two codewords is enabled as illustrated in Table 11 below, it may explicitly indicate 'single layer precoding' through a predetermined bit value of the precoding information field for four antenna ports.

TABLE 11

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: precoder cycling with large delay CDD |
| 1 | 2 layers: precoder cycling with large delay CDD | 1 | 3 layers: precoder cycling with large delay CDD |
| 2 | Singler layer precoding | 2 | 4 layers: precoder cycling with large delay CDD |
| 3 | reserved | 3 | Reserved |

Alternatively, it may indicate single layer precoding from the precoding information field for four antenna ports and at the same time indicate whether the layer corresponding to single layer precoding is the first layer or the second layer (layer 0 or layer 1) as illustrated in Table 12 below.

TABLE 12

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: precoding without CDD |
| 1 | Single layer precoding (layer 0) | 1 | — |
| 2 | Singler layer precoding (layer 1) | 2 | — |
| 3 | — | 3 | — |

In Table 12, if only one codeword is enabled, a bit field 0 of the precoding information field indicates transmit diversity. In this case, the user equipment can perform data demodulation by using either a cell-specific reference signal or a dedicated reference signal for transmission of two layers.

According to the aforementioned embodiment of the present invention, a DCI format that can support SU-MIMO and MU-MIMO at the same time through dual layer beamforming is provided. In other words, the DCI formats used for dual layer beamforming and single layer beamforming have the same bit field size.

Next, new definition of a bit field of the DCI format 1A or the DCI format 1D, which corresponds to the exiting DCI format, in accordance with another embodiment of the present invention will be described with reference to FIG. 4 and FIG. 5.

FIG. 4 is a diagram illustrating a DCI format 1A defined in the existing 3GPP LTE standard (Release 8). The DCI format 1A is defined for compact scheduling of one PDSCH codeword in various transmission modes, and can be used for transmit diversity transmission. This DCI format 1A can be defined newly for dual layer beamforming. If dual layer beamforming is defined as a transmission mode (as described above, transmission mode is set semi-statically by upper layer signaling), the user equipment can define a part of bit fields of the aforementioned DCI format 1A differently from the transmit diversity scheme.

Among the fields defined in the DCI format 1A, a 'flag for format 0/format 1A differentiation' field is set to 1 bit, wherein a value of 0 in the 'flag for format 0/format 1A differentiation' field represents format 0, and a value of 0 therein represents format 1A. The format 1A is used for a random access procedure initiated by PDCCH order only if the format 1A CRC is scrambled with C-RNTI.

Also, among the fields defined in the DCI format 1A, a 'localized/distributed VRB assignment flag' field is set to 1 bit. If the 'flag for format 0/format 1A differentiation' field is set to 1, the 'localized/distributed VRB assignment flag' field is set to 0. In other case, a value of 0 in the 'localized/distributed VRB assignment flag' field represents localized VRB assignment, and a value of 1 therein represents distributed VRB assignment.

In the first embodiment, the 'flag for format 0/format 1A differentiation' field is newly defined for dual layer beamforming. For example, if a logic value of the 'flag for format 0/format 1A differentiation' field is the first value, it indicates transmit diversity transmission. If a logic value of the 'flag for format 0/format 1A differentiation' field is the second value, it indicates single layer beamforming transmission. As described above, the first value of the logic value of any one of the bit fields represents 0 or off while the second value represents 1 or on. Also, the first value of the logic value of any one of the bit fields may represent 1 or on while the second value may represent 0 or off.

Alternatively, if the logic value of the 'flag for format 0/format 1A differentiation' field is the first value, it may be newly defined that it indicates the first layer (layer 0) in the dedicated reference signal pattern. If the logic value of the 'flag for format 0/format 1A differentiation' field is the second value, it may also be newly defined that it indicates the second layer (layer 1).

In the second embodiment, the 'localized/distributed VRB assignment flag' field is newly defined for dual layer beamforming.

For example, if a logic value of the 'localized/distributed VRB assignment flag' field is the first value, it indicates transmit diversity transmission. If the logic value of the 'localized/distributed VRB assignment flag' field is the second value, it indicates single layer beamforming transmission.

Alternatively, if the logic value of the 'localized/distributed VRB assignment flag' field is the first value, it may indicate the first layer (layer 0) in the dedicated reference signal pattern. If the logic value of the 'localized/distributed VRB assignment flag' field is the second value, it may indicate the second layer (layer 1).

In the third embodiment, the 'flag for format 0/format 1A differentiation' field and the 'localized/distributed VRB assignment flag' field are newly defined for dual layer beamforming. For example, 1 bit of 2 bits for the 'flag for format 0/format 1A differentiation' field and the 'localized/distributed VRB assignment flag' field can indicate transmit diversity or single layer beamforming, and the other 1 bit can represent the first layer or the second layer.

FIG. 5 is a diagram illustrating a DCI format 1D defined in the existing 3GPP LTE standard (Release 8).

The DCI format 1D is defined for compact scheduling of one PDSCH codeword having precoding power offset information, and can be used for MU-MIMO transmission. This DCI format 1D can be defined newly for dual layer beamforming. If dual layer beamforming is defined as a transmission mode, the user equipment can define a part of bit fields of the aforementioned DCI format 1D differently from the MU-MIMO scheme.

Among the fields defined in the DCI format 1D, a 'TPMI information for precoding' field represents a codebook index used for transmission, and is set to 2 bits when the base station includes two antenna ports, and is set to 4 bits when the base station include four antenna ports.

In the fourth embodiment of the present invention, 'TPMI information for precoding' field of the DCI format 1D can be defined newly for dual layer beamforming. Transmit diversity transmission or single layer beamforming can be represented by 1 bit of the 'TPMI information for precoding' field. If a logic value of 1 bit in the 'TPMI information for precoding' field given by 2 bits or 4 bits is the first value, it indicates transmit diversity transmission. If the logic value of 1 bit in the 'TPMI information for precoding' field given by 2 bits or 4 bits is the second value, it indicates single layer beamforming.

Also, if the logic value of the 'TPMI information for precoding' field of 1 bit is the first value, it may indicate the first layer (layer 0). If the logic value of the 'TPMI information for precoding' field of 1 bit is the second value, it may indicate the second layer (layer 1).

Also, the 'TPMI information for precoding' field of 2 bits may be used. In this case, 1 bit may indicate transmit diversity transmission or single layer beamforming, and the other 1 bit may indicate the first layer or the second layer in the dedicated reference signal pattern.

Hereinafter, new definition of the DCI format for dual layer beamforming in accordance with another embodiment of the present invention will be described.

As described above, since dual layer beamforming has maximum rank 2 equivalent to the number of transport blocks used for transmission, a separate indicator for transmission rank is not needed. In other words, disabled transport block can be determined depending on that MCS index value of the transport block is set to 0 (or MCS index value is 0 and RV value is set to 1). Accordingly, it can be recognized implicitly that the user equipment corresponds to rank 1 if one of two transport blocks is disabled whereas the user equipment corresponds to rank 2 if two transport blocks are all enabled. Also, if a dedicated reference signal (precoded UE specific reference signal) is used for each layer, a weight matrix used for precoding is not needed. Accordingly, it is not required that the precoding information field be included in the downlink control information (DCI) format (namely, 0 bit is allocated to the precoding information field) in case of dual layer beamforming based on a dedicated reference signal.

Also, if the dual layer beamforming transmission mode is used (transmission mode is set semi-statically by upper layer signaling), the dedicated reference signal for dual layer beamforming is used, and the user equipment can receive data through two layers or a single layer. If dual layers are used, the user equipment can be operated in accordance with the SU-MIMO mode. If a single layer is used, the user equipment can be operated in accordance with the SU-MIMO mode or the MU-MIMO mode. It is considered that the same DCI format is used for the SU-MIMO mode and the MU-MIMO mode so as not to identify the SU-MIMO mode from the MU-MIMO mode in dual layer beamforming. In other words, in dual layer beamforming and single layer beamforming, control information is transferred by DCI having the same bit field size, and a part of bit fields used for dual layer beamforming is defined as an indicator for single layer beamforming. Also, if the dual layer beamforming transmission mode is used, a compact DCI format may be defined for the user equipment that receives single layer only.

An example of a new DCI format that satisfies the aforementioned considerations will be described with reference to FIG. 6. The DCI format illustrated in FIG. 6 includes a plurality of fields the same as those of the aforementioned DCI 2A. Hereinafter, the DCI format will be described based on the difference between a new DCI format and the existing DCI 2A format.

The DCI format of FIG. 6 provides control information for single layer beamforming and dual layer beamforming.

Resource Block Assignment, TPC command for PUCCH, Downlink Assignment Index, HARQ process number, MCS index for each of transport blocks 1 and 2, new data indicator, redundancy version, and precoding information can be defined in both modes of single layer beamforming and dual layer beamforming. These fields are substantially the same as those defined in the existing DCI format 2A. Of the fields, the precoding information field is set to 0 bit as described above.

Unlike the existing DCI format 2A, the 'transport block to codewords swap flag' field in the DCI format of FIG. 6 is used for dual layer beamforming. In case of single layer beamforming transmission, the 'transport block to codewords swap flag' field can be defined as the 'layer indicator'.

If two transport blocks are all enabled, the 'transport block to codewords swap flag' field can be used as information indicating mapping relation between the transport block and codeword, wherein the mapping relation can be defined as illustrated in Table 1 above.

If one transport block is enabled and the other transport block is disabled, the transport block enabled as illustrated in Table 2 can be mapped with codeword 0. In case of single layer beamforming where only one codeword is enabled, the 'transport block to codewords swap flag' field is defined as the 'layer indicator'. If a logic value of the layer indicator is the first value (0 or off), it indicates the first layer (layer X). If the logic value of the layer indicator is the second value (1 or on), it indicates the second layer (layer Y). Alternatively, in the logic value of the layer indicator, the first value may indicate 1 or on, and the second value may indicate 0 or off. Also, the first value may indicate the mapping relation with the first layer while the second value may indicate the mapping relation with the second layer. The layer indicator can be defined as illustrated in Table 13 below.

TABLE 13

| Transport block to codeword swap flag value (Layer Indication flag value) | Codeword 0 (enabled) | Codeword 1 (disabled) |
| --- | --- | --- |
| 0 | Layer X/Antenna port X | |
| 1 | Layer X/Antenna port X | |

The 'layer indicator' may be designated as 'antenna port indicator' or 'reference signal position (RS position)'. Also, the 'layer indicator' may be defined as indicate layer/antenna port corresponding to enabled codeword or layer (or antenna port) where the reference signal is located. The user equipment can identify a layer to which its useful channel information belongs, through information acquired through the layer indicator.

According to the new DCI format defined in FIG. 6, since the DCI formats for dual layer beamforming and single layer beamforming can be set to have the same size, dynamic mode adaptation of the SU-MIMO and the MU-MIMO and dynamic rank adaptation of rank 1 and rank 2 can be implemented.

Next, another embodiment of a new DCI format that satisfies the aforementioned considerations will be described with reference to FIG. 7. The description of the DCI format illustrated in FIG. 7, which is common to FIG. 6, will be omitted for conciseness.

In the DCI format of FIG. 7, the 'transport block to codewords swap flag' field is defined in the same manner as the existing DCI format. In other words, the 'transport block to codewords swap flag' is used for dual layer beamforming, and if two codewords are all enabled, it can be used as information indicating the mapping relation between transport block and codeword as defined in Table 1 above. Meanwhile, if one transport block is enabled and the other transport block is disabled, the transport block enabled as illustrated in Table 2 can be mapped with codeword 0.

In case of the DCI format of FIG. 7, as the MCS index value of the transport block is set to 0 (or MCS index value is set to 0 and RV value is set to 1), if one transport block is enabled and the other one transport block is disabled, the user equipment can implicitly recognize single layer beamforming transmission.

The new data indicator (NDI) field for the disabled transport block can be defined as the layer indicator of the enabled transport block. For example, if transport block 1 is enabled and transport block 2 is disabled, the NDI of the transport block 1 indicates whether data transmitted through the enabled transport block 1 are new data or retransmitted data, and the NDI field of the transport block 2 can be defined as the layer indicator (or antenna port indicator/reference signal position) for the transport block 1. For example, if a logic value of the NDI of the disabled transport block is the first value (0 or off), it indicates the first layer (layer X) or the first antenna port (antenna port X). If the logic value of the NDI of the disabled transport block is the second value (1 or on), it indicates the second layer (layer Y) or the second antenna port (antenna port Y). Alternatively, the first value of the logic value of the NDI field may indicate 1 or on, and the second value may indicate 0 or off. Also, the first value may indicate the mapping relation with the first layer while the second value may indicate the mapping relation with the second layer. The user equipment can identify a layer to which its useful channel information belongs, through information acquired through the layer indicator. This layer indicator can be defined as illustrated in Table 14 below.

TABLE 14

| New data indicator of disabled transport block | Codeword 0 (enabled) | Codeword 1 (disabled) |
| --- | --- | --- |
| 0 | Layer X/Antenna port X | |
| 1 | Layer Y/Antenna port Y | |

According to the new DCI format defined in FIG. 7, since the DCI formats for dual layer beamforming and single layer beamforming can be set to have the same size, dynamic mode adaptation of the SU-MIMO and the MU-MIMO and dynamic rank adaptation of rank 1 and rank 2 can be implemented.

Next, other embodiment of a new DCI format that satisfies the aforementioned considerations will be described with reference to FIG. 8. The description of the DCI format illustrated in FIG. 8, which is common to FIG. 6, will be omitted for conciseness.

Unlike the existing DCI format 2A, the 'transport block to codewords swap flag' field is not defined in the DCI format of FIG. 8. If two codewords are all enabled, the codeword 0 is mapped with transport block 1 and the codeword 1 is mapped with transport 2.

Meanwhile, if one transport block is enabled and the other transport block is disabled, the transport block enabled as illustrated in Table 2 can be mapped with codeword 0.

In case of the DCI format of FIG. 8, as the MCS index value of the transport block is set to 0 (or MCS index value is set to 0 and RV value is set to 1), if one transport block is enabled and the other one transport block is disabled, the user equipment can implicitly recognize single layer beamforming transmission.

The new data indicator (NDI) field for the disabled transport block can be defined as the layer indicator of the enabled transport block. For example, if the transport block 1 is enabled and the transport block 2 is disabled, the NDI of the transport block 1 indicates whether data transmitted through the enabled transport block 1 are new data or retransmitted data, and the NDI field of the transport block 2 can be defined as the layer indicator (or antenna port indicator/reference signal position) for the transport block 1. For example, if a logic value of the NDI of the disabled transport block is the first value (0 or off), it indicates the first layer (layer X) or the first antenna port (antenna port X). If the logic value of the NDI of the disabled transport block is the second value (1 or on), it indicates the second layer (layer Y) or the second antenna port (antenna port Y). Alternatively, the first value of the logic value of the NDI field may indicate 1 or on, and the second value may indicate 0 or off. Also, the first value may indicate the mapping relation with the first layer while the second value may indicate the mapping relation with the second layer. The user equipment can identify a layer to which its useful channel information belongs, through information acquired through the layer indicator. This layer indicator can be defined as illustrated in Table 14 above.

According to the new DCI format defined in FIG. 8, since the DCI formats for dual layer beamforming and single layer beamforming can be set to have the same size, dynamic mode adaptation of the SU-MIMO and the MU-MIMO and dynamic rank adaptation of rank 1 and rank 2 can be implemented.

The DCI formats described with reference to FIG. 6 to FIG. 8 can be designated as DCI formats 2B different from the existing DCI formats 2 and 2A, and the antenna ports X and Y used for dual layer beamforming can be designated as antenna ports 7 and 8 different from those defined in the existing LTE standard.

According to various embodiments of the present invention, in order to support dual layer beamforming, the existing DCI format can be defined newly or a new DCI format different from the existing DCI format can be defined, whereby downlink control information can be provided to the user equipment. In particular, in dual layer beamforming, the user equipment can implicitly identify whether any one of two transport blocks is disabled, through the MCS field of the transport block without rank information through an explicit rank indicator. Also, in dual layer beamforming transmission, information of 1 bit is required to indicate layer (antenna port) used for transmission. In this case, the NDI bit field for the disabled one two transport blocks can be used to indicate the layer, whereby transmission for two user equipments that use a single layer can be supported.

Figure 9:
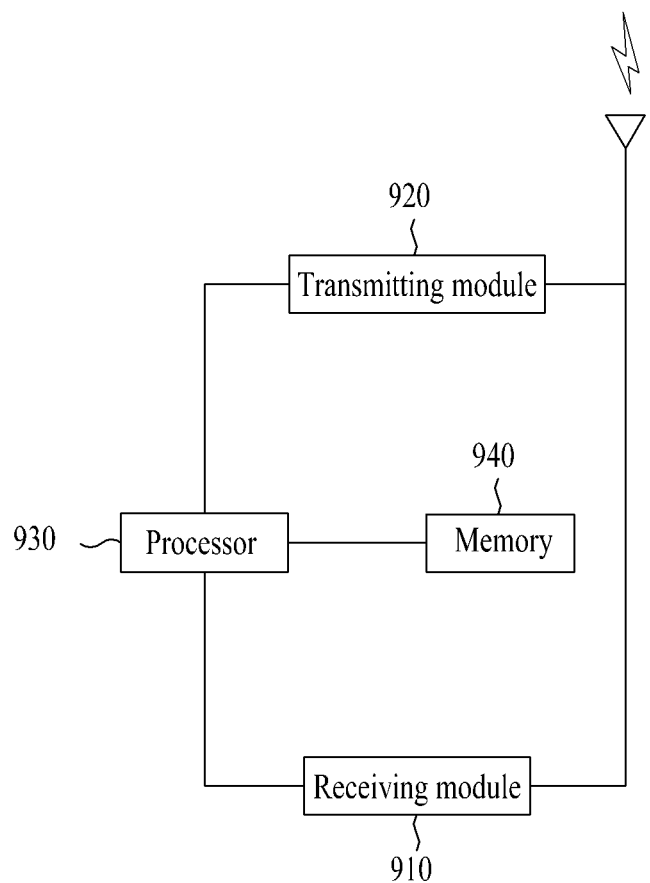
FIG. 9 is a diagram illustrating a configuration of a preferred embodiment of a user equipment according to the present invention.

FIG. 9 is a diagram illustrating a configuration of a preferred embodiment of a user equipment according to the present invention.

Referring to FIG. 9, the user equipment includes a receiving module 910, a transmitting module 920, a processor 930, and a memory 940. The receiving module 910 can receive various signals, data and information from a base station. The transmitting module 920 can transmit various signals, data and information to the base station. In this embodiment, the user equipment can receive a downlink signal from the base station in a MIMO system that supports dual layer transmission based on first and second antenna ports. The processor 930 of the user equipment performs a control operation so that the receiving module 910 receives downlink control information (DCI) through a downlink control channel, and receives downlink data through a downlink data channel, wherein the downlink data include one or more of first and second transport blocks. The downlink control information includes a new data indicator (NDI) for each of the first and second transport blocks. If the first transport block is disabled and the second transport block is enabled, the NDI for the first transport block indicates an antenna port through which the second transport block is received.

In addition, the processor 930 performs an operation function for information received by the user equipment and information to be transmitted from the user equipment to the outside. The memory 940 stores the operated information for a predetermined time period therein, and can be replaced with another module such as a buffer (not shown).

Figure 10:
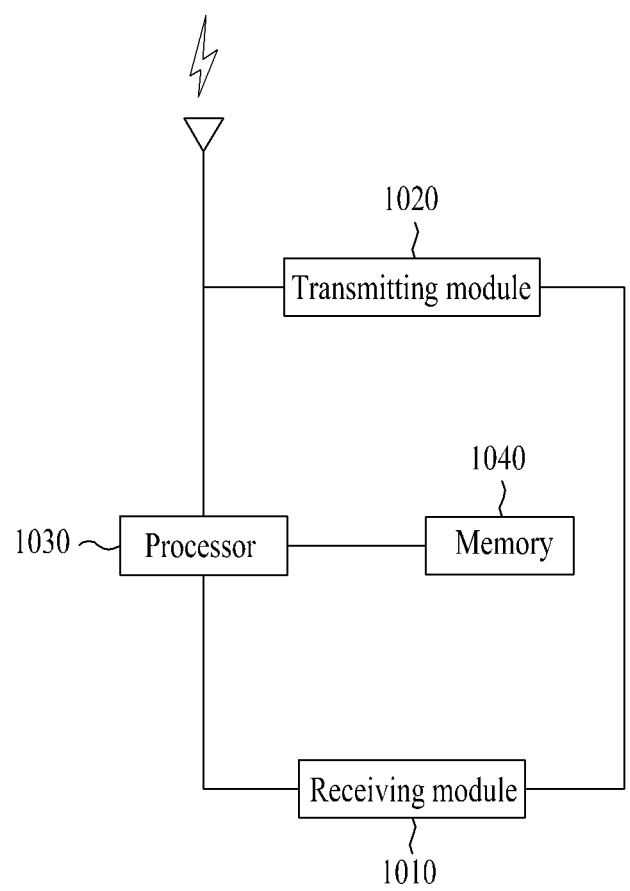
FIG. 10 is a diagram illustrating a configuration of a preferred embodiment of a base station according to the present invention.

FIG. 10 is a diagram illustrating a configuration of a preferred embodiment of a base station according to the present invention.

Referring to FIG. 10, the base station includes a receiving module 1010, a transmitting module 1020, a processor 1030, and a memory 1040. The transmitting module 1020 can transmit various signals, data and information to the user equipment. The receiving module 1010 can receive various signals, data and information from the user equipment. In this embodiment, the base station can transmit a downlink signal to the user equipment in a MIMO system that supports dual layer transmission based on first and second antenna ports. The processor 1030 of the base station performs a control operation so that the transmitting module 1020 transmits downlink control information (DCI) through a downlink control channel, and transmits downlink data through a downlink data channel, wherein the downlink data include one or more of first and second transport blocks. The downlink control information includes a new data indicator (NDI) for each of the first and second transport blocks. If the first transport block is disabled and the second transport block is enabled, the NDI for the first transport block indicates an antenna port through which the second transport block is transmitted.

In addition, the processor 1030 performs an operation function for information received by the base station and information to be transmitted from the base station to the outside. The memory 1040 stores the operated information for a predetermined time period therein, and can be replaced with another module such as a buffer (not shown).

The aforementioned embodiments according to the present invention can be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for receiving a downlink signal by a user equipment (UE) from a base station, the method comprising:
receiving downlink control information (DCI) through a downlink control channel,
wherein the DCI includes resource assignment information for downlink data, and
wherein the DCI includes a new data indicator (NDI) for each of a first transport block and a second transport block; and
receiving the downlink data through a downlink data channel based on the resource assignment information, the downlink data including at least the first transport block or the second transport block,
wherein, if the first transport block or the second transport block is disabled, one antenna port among a first antenna port and a second antenna port is used for single-antenna port transmission of an enabled transport block,
wherein a 1-bit NDI of the disabled transport block included in the DCI indicates the one antenna port used for the single-antenna port transmission of the enabled transport block,
wherein the DCI does not use a TB-to-codeword flag, and
wherein another antenna port among the first antenna port and the second antenna port is allowed to be associated with transmission of downlink data to another UE.

2. The method of claim 1,
wherein the first antenna port and the second antenna port correspond, respectively, to a first layer and a second layer for a dual layer transmission of the first transport block and the second transport block.

3. The method of claim 1,
wherein, a first value and a second value of the 1-bit field respectively indicate that the first antenna port is used for the enabled transport block and the second antenna port is used for the enabled transport block.

4. The method of claim 1, wherein:
if both the first transport block and the second transport block are enabled, the first transport block is mapped to a first codeword, and the second transport block is mapped to a second codeword, and
if the first transport block or the second transport block is disabled, an enabled transport block is mapped to the first codeword.

5. The method of claim 1, wherein, if both the first transport block and the second transport block are enabled, the first antenna port and the second antenna port are used for spatial multiplexing of the downlink data.

6. The method of claim 1,
wherein the DCI further includes modulation and coding scheme (MCS) for each of the first transport block and the second transport block, and the MCS is used for determining whether a corresponding transport block is disabled.

7. The method of claim 1, further comprising receiving a UE-specific reference signal for demodulating the downlink data for at least the first antenna port or the second antenna port.

8. The method of claim 1, wherein the downlink data channel is a physical downlink common channel (PDSCH), and the downlink control channel is a physical downlink control channel (PDCCH).

9. A method for transmitting a downlink signal by a base station to a user equipment, the method comprising:
transmitting downlink control information (DCI) through a downlink control channel,
wherein the DCI includes resource assignment information for downlink data, and
wherein the DCI includes a new data indicator (NDI) for each of a first transport block and a second transport block; and
transmitting the downlink data through a downlink data channel in accordance with the resource assignment information, the downlink data including at least the first transport block or the second transport block,
wherein, if the first transport block or the second transport block is disabled, one antenna port among a first antenna port and a second antenna port is used for single-antenna port transmission of an enabled transport block,
wherein 1-bit NDI of the disabled transport block included in the DCI indicates the one antenna port used for the single-antenna port transmission of the enabled transport block,
wherein the DCI does not use a TB-to-codeword flag, and
wherein another antenna port among the first antenna port and the second antenna port is allowed to be associated with transmission of downlink data to another user equipment.

10. A user equipment for receiving a downlink signal from a base station, the user equipment comprising:
a receiving module;
a transmitting module: and
a processor,
wherein the processor is configured to:
control the receiving module to receive downlink control information (DCI) through a downlink control channel,
wherein the DCI includes resource assignment information for downlink data, and
wherein the DCI includes a new data indicator (NDI) for each of a first transport block and a second transport block; and
control the receiving module to receive the downlink data through a downlink data channel based on the resource assignment information, the downlink data including at least the first transport block or the second transport block,
wherein, if the first transport block or the second transport block is disabled, one antenna port among a first antenna port and a second antenna port is used for single-antenna port transmission of an enabled transport block,
wherein a 1-bit NDI of the disabled transport block included in the DCI indicates the one antenna port used for the single-antenna port transmission of the enabled transport block,
wherein the DCI does not use a TB-to-codeword flag, and
wherein another antenna port among the first antenna port and the second antenna port is allowed to be associated with transmission of downlink data to another user equipment.

11. A base station for transmitting a downlink signal to a user equipment, the base station comprising:

a receiving module;
a transmitting module; and
a processor,
wherein the processor is configured to:
   control the transmitting module to transmit downlink control information (DCI) through a downlink control channel,
   wherein the DCI includes resource assignment information for downlink data, and
   wherein the DCI includes a new data indicator (NDI) for each of a first transport block and a second transport block; and
   control the transmitting module to transmit the downlink data through a downlink data channel in accordance with the resource assignment information, the downlink data including at least the first transport block or the second transport block,
   wherein, if the first transport block or the second transport block is disabled, one antenna port among a first antenna port and a second antenna port is used for single-antenna port transmission of an enabled transport block,
   wherein a 1-bit NDI of the disabled transport block included in the DCI indicates the one antenna port used for the single-antenna port transmission of the enabled transport block,
wherein the DCI does not use a TB-to-codeword flag, and
wherein another antenna port among the first antenna port and the second antenna port is allowed to be associated with transmission of downlink data to another user equipment.

\* \* \* \* \*